US012009197B2

(12) United States Patent
Papanastasiou

(10) Patent No.: US 12,009,197 B2
(45) Date of Patent: Jun. 11, 2024

(54) METHOD AND APPARATUS

(71) Applicant: FASMATECH SCIENCE AND TECHNOLOGY SA, Agia Paraskevi (GR)

(72) Inventor: Dimitris Papanastasiou, Kesariani (GR)

(73) Assignee: FASMATECH SCIENCE AND TECHNOLOGY SA, Agia Paraskevi (GR)

( * ) Notice: Subject to any disclaimer, the term of this patent is extended or adjusted under 35 U.S.C. 154(b) by 81 days.

(21) Appl. No.: 17/723,501

(22) Filed: Apr. 19, 2022

(65) Prior Publication Data

US 2022/0344144 A1 Oct. 27, 2022

(30) Foreign Application Priority Data

Apr. 23, 2021 (EP) .................................... 21170210

(51) Int. Cl.
*H01J 49/42* (2006.01)
*H01J 49/02* (2006.01)

(52) U.S. Cl.
CPC ........ *H01J 49/4225* (2013.01); *H01J 49/022* (2013.01)

(58) Field of Classification Search
CPC .... H01J 49/045; H01J 49/0045; H01J 49/004; H01J 49/022; H01J 49/422; H01J 49/4225
See application file for complete search history.

(56) References Cited

U.S. PATENT DOCUMENTS

| | | | | |
|---|---|---|---|---|
| 8,866,070 B2 * | 10/2014 | Morokuma | H01J 49/26 250/281 |
| 2003/0168592 A1 | 9/2003 | Yamada et al. | |

(Continued)

FOREIGN PATENT DOCUMENTS

| | | |
|---|---|---|
| EP | 2450942 A2 | 5/2012 |
| EP | 3422388 A2 | 1/2019 |
| WO | WO 2020/200833 A1 | 10/2020 |

OTHER PUBLICATIONS

Shannon L. Cook et al., "Metastable atom-activated dissociation mass spectrometry: leucine . . . ", Journal of Mass Spectrometry, vol. 44, No. 8, May 22, 2009, pp. 1211-1223.

*Primary Examiner* — David E Smith
(74) *Attorney, Agent, or Firm* — DP IP GROUP; Franco S. De Liguori

(57) ABSTRACT

An apparatus includes a linear ion trap and a charged particle source coupled to one another in a vacuum housing. The linear ion trap has a longitudinal axis and a trapping region configured to store analyte ions. The charged particle source has a conduit, a pulse valve, and a discharge device. The conduit extends towards the trapping region in a direction perpendicular to the longitudinal axis of the linear ion trap and has an entrance and an exit. The pulse valve is disposed in fluid communication with the conduit and is configured to release a gas pulse from a gas supply into the entrance of the conduit. The discharge device is electrically coupled to an electrical potential supply and disposed between the entrance and the exit of the conduit. The electrical potential supply is configured to apply a high voltage to the discharge device to generate a discharge in the gas pulse in the conduit, thereby generating charged particles from the gas and accelerating the generated charged particles towards the trapping region in the direction perpendicular to the longitudinal axis (Continued)

of the linear ion trap to activate analyte ions stored in the trapping region.

22 Claims, 7 Drawing Sheets

(56) References Cited

U.S. PATENT DOCUMENTS

| | | | | |
|---|---|---|---|---|
| 2006/0192100 | A1 | 8/2006 | Zubarev et al. | |
| 2008/0245963 | A1* | 10/2008 | Land | H01J 49/145<br>250/288 |
| 2009/0294649 | A1* | 12/2009 | Shabanowitz | H01J 49/12<br>250/288 |
| 2013/0032711 | A1 | 2/2013 | Ishiguro et al. | |
| 2016/0141163 | A1 | 5/2016 | Yamamoto et al. | |
| 2017/0221694 | A1* | 8/2017 | Papanastasiou | H01J 49/005 |

* cited by examiner

METHOD AND APPARATUS

BACKGROUND

Field

The technical field of the invention relates to ion analysis using mass spectrometry. More particularly, to the development of new techniques for activating and dissociating analyte ions in a radiofrequency ion trap. Specifically, the invention relates to the development of new analytical tools employed in tandem mass spectrometry for generating information at molecular level by interacting trapped ions with externally injected charged particles and reactive neutral species.

BACKGROUND INFORMATION

Innovations in analytical instrumentation and particularly advancements in fragmentation methods have established mass spectrometry as an indispensable tool in bioanalytical chemistry research. Radio-frequency (RF) ion traps have evolved into powerful analytical devices for activating and dissociating analyte ions to obtain structural information and identify analyte species. The enhanced performance of linear quadrupole ion traps has enabled the deployment of the technology in extremely demanding application areas concerned with the analysis of highly complex biological and environmental samples.

Methods for dissociating ions and involving metastable and neutral radical species injected in quadrupole ion traps have been previously described. Fragmentation of analyte ions using a fast atom bombardment (FAB) source producing electronically excited noble gas species in a cold cathode discharge was shown to produce N-Cα and S—S bond cleavage for peptide cations and Cα—C cleavage for anions (Misharin, A. S. et al., *Dissociation of Peptide Ions by Fast Atom Bombardment in a Quadrupole Ion Trap. Rapid Commun. Mass Spectrom.* 19, 2163-2171, 2005). Irradiation of trapped ions with energetic beams of noble gases as a means for dissociating ions termed metastable atom-activated dissociation (MAD) has also been developed indicating the electron-mediated fragmentation character of this method and emphasizing the benefit for analyzing singly charged peptides (Cook, S. L. et al., *Metastable Atom Activated Dissociation Mass Spectrometry: Leucine/Isoleucine Differentiation and Ring Cleavage of Proline Residues. J. Mass Spectrom.* 44, 1211-1223, 2009). More recent fragmentation methods realized in quadrupole ion traps include the hydrogen attachment/abstraction dissociation (HAD) of peptides using a heated tungsten capillary to dissociate molecular hydrogen (Takahashi, H. et al., *Hydrogen Attachment/Abstraction Dissociation of Gas Phase Peptide Ions for Tandem Mass Spectrometry. Anal. Chem.* 88, 3810-3816, 2016).

There is an increasing demand for generating fragment ions from analyte species with greater efficiency to enhance the quality and quantity of the information produced by tandem mass spectrometry. Despite the rather extended range of fragmentation tools and methods developed to date, activation and dissociation using charged particles and reactive neutral species has not been yet commercialized, primarily due to the low efficiency of such processes compared to fragmentation based on collisions, electrons and photons. Furthermore, the complexity of sources producing charged particles and neutral species has hindered the high level of integration required in modern instruments. Fine control of the kinetic energy of charged particles and reactive neutrals, the production of high density beams for efficient activation—dissociation of analyte ions without affecting vacuum conditions and, ultimately, pulsed operation to achieve the fast synchronization required between the different processes performed in ion traps sequentially are yet to be met. Finally, it is highly desirable to produce a unified external source for selective injection of charged particles or reactive neutral species into an ion trap. Producing a configurable design to combine or to switch between the two different modes of operation on a fast time scale is a critical step forward in the development of high-end instrumentation.

Hence, there is a need to improve generation of charged particles and/or reactive neutral species for injection into an ion trap.

SUMMARY

It is one aim of the present invention, amongst others, to provide an apparatus and a method which at least partially obviate or mitigate some of the disadvantages of the prior art, whether identified herein or elsewhere. For instance, it is an aim of embodiments of the invention to provide an apparatus that provides charged particles, and optionally reactive neutral particles, for injection into an ion trap. For instance, it is an aim of embodiments of the invention to provide a method that provides charged particles, and optionally reactive neutral particles, for injection into an ion trap.

A first aspect provides an apparatus comprising:

a linear ion trap comprising two pairs of pole electrodes and a radiofrequency, RF, electrical potential supply configured to apply respective RF waveforms to the pairs of pole electrodes, thereby forming a RF trapping field component to trap analyte ions radially in a trapping region of the linear ion trap for processing of the analyte ions therein;

a charged particle source comprising a pulse valve, a conduit, having an entrance in fluid communication therewith and an exit, wherein the conduit extends in the direction of the trapping region, and a discharge device electrically coupled to an electrical potential supply and disposed between the entrance and the exit of the conduit, wherein the pulse valve is configured to release a gas pulse from a gas supply into the entrance of the conduit and wherein the electrical potential supply is configured to apply a high voltage to the discharge device to generate a discharge in the gas pulse in the conduit, thereby generating charged particles from the gas and accelerating the generated charged particles in the direction of the trapping region.

A second aspect provides a method of directing charged particles, and optionally reactive neutral particles, into a trapping region of a linear ion trap, the method comprising:

releasing a gas pulse from a gas supply into the entrance of a conduit extending in the direction of the trapping region; and generating a discharge in the gas pulse in the conduit, thereby generating charged particles from the gas and accelerating the generated charged particles in the direction of the trapping region;

optionally, converting a fraction of the accelerated charged particles into reactive neutral particles by transporting the charged particles through an incandescent electron source arranged between the discharge and the trapping region; and optionally, directing the remainder fraction of the accelerated charged particles together with the converted reactive neutral particles in the direction of the trapping region.

A third aspect provides a mass spectrometer comprising an apparatus according to the first aspect and/or adapted to perform the method according to the second aspect.

Advantageously, the present invention discloses a new apparatus and method for producing charged particles and reactive neutral species (also known as reactive neutral particles, reactive neutrals) for activating and dissociating analyte ions stored (i.e. trapped) in a RF ion trap. The apparatus and method are configurable to switch between three different modes of operation: injection of charged particles alone, injection of reactive neutral species alone, and injection of a mixed beam of charged particles and reactive neutrals. The new source of charged particles and optionally reactive neutrals disclosed in the present invention is operated in a pulsed mode by controlling the admission of gas using a gas pulse valve. Pulsed operation allows precise synchronization of the generation of the charged particles and optionally the reactive neutrals with the advanced operations performed in an ion trap sequentially. Pulsed injection of gas to generate the charged particles and optionally the reactive neutrals also allows for producing high density beams due to elevated pressures accessible during pulsed injection. More importantly, pulsed operation using pulses of gas has a negligible effect on the vacuum conditions and does not influence the different processes performed in the ion trap and optimized at different pressures, nor does it affect the operation of a mass analyzer downstream of the ion trap that must be operated under high vacuum conditions. In addition, the new hybrid source design (i.e. the apparatus and method) disclosed in the present invention is configurable to control the kinetic energy of both the charged particles and reactive neutrals to maximize the reaction cross section with trapped analyte ions. These advantages create a new tool for activating and dissociating a wide range of analyte ions with high efficiency and in a highly regulated manner compared to the different designs disclosed in the prior art.

BRIEF DESCRIPTION OF THE DRAWINGS

For a better understanding of the invention, and to show how exemplary embodiments of the same may be brought into effect, reference will be made, by way of example only, to the accompanying diagrammatic Figures, in which.

DETAILED DESCRIPTION OF THE EMBODIMENTS

Figure 1:
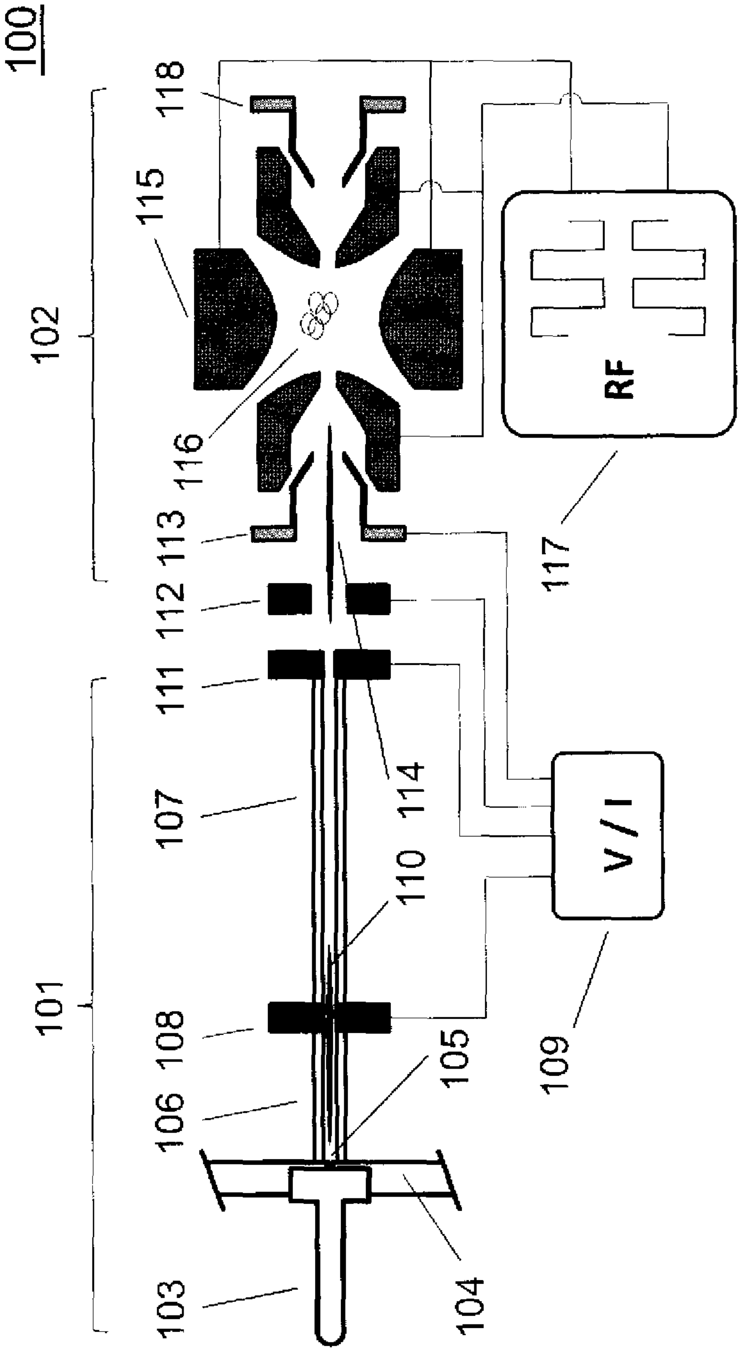
FIG. 1 schematically depicts an apparatus according to an exemplary embodiment.

According to the present invention there is provided an apparatus, as set forth in the appended claims. Also provided is a method. Other features of the invention will be apparent from the claims, and the description that follows.

Apparatus

The first aspect provides an apparatus comprising:

a linear ion trap comprising two pairs of pole electrodes and an RF electrical potential supply configured to apply respective RF waveforms to the pairs of pole electrodes, thereby forming a RF trapping field component to trap analyte ions radially in a trapping region of the linear ion trap for processing of the analyte ions therein;

a charged particle source comprising a pulse valve, a conduit, having an entrance in fluid communication therewith and an exit, wherein the conduit extends in the direction of the trapping region, and a discharge device electrically coupled to an electrical potential supply and disposed between the entrance and the exit of the conduit, wherein the pulse valve is configured to release a gas pulse from a gas supply into the entrance of the conduit and wherein the electrical potential supply is configured to apply a high voltage to the discharge device to generate a discharge in the gas pulse in the conduit, thereby generating charged particles from the gas and accelerating the generated charged particles in the direction of the trapping region.

In other words, the apparatus includes the linear ion trap designed with at least one trapping region coupled to the external source of charged particles and optionally reactive neutral species. External injection of charged particles and optionally reactive neutral species may be utilized for activation of analyte ions stored in the trapping region of the linear ion trap. Ion activation may involve fragmentation, electron ionization, attachment or detachment of protons and electrons leading to charge enhanced or charge reduced, even and/or odd electron ions. Ion activation may also involve structural changes of the analyte ions that may or may not lead to fragmentation. Ejection of charged particles and reactive neutrals can be performed along the axis of the linear ion trap and also transverse, for example perpendicular, to the axis of the linear ion trap through an opening on one of the pole electrodes or through a gap between two neighbouring pole electrodes.

Linear Ion Trap

The linear ion trap is designed with at least one trapping region to that allows axial confinement of the analyte ions along the symmetry axis of the ion trap. Ions are confined radially by a RF trapping field component formed by the application of a pair of antiphase RF waveforms applied to the pole electrodes of the ion trap. Sinusoidal, rectangular or other types of periodic waveforms, symmetric or asymmetric, can be applied to confine ions radially. In one example, the linear ion trap is a quadrupole ion trap where the pole electrodes are designed with hyperbolic surfaces. Hexapole, octapole or other higher field-order linear ion traps can also be utilized for radial ion confinement. Segmentation along the axis of the ion trap allows for the application of DC electrical potentials forming an axial DC field component enabling axial transfer and storage of ions in different trapping regions. Axial transfer and storage can also be enabled by one or more electrodes disposed externally to the linear ion trap and arranged either along the axis or on the perimeter of pole electrodes for the generation of electrical fields penetrating into the RF trapping field and forming DC gradients and trapping regions.

In a segmented linear ion trap, ions are transferred to the trapping region and confined axially by adjusting the DC electrical potentials applied to the ion trap segments or to terminal electrodes of the linear ion trap. A terminal electrode is an end-electrode disposed on either end of the linear ion trap to axially terminate the RF trapping field. The trapping region may be generated (a) between three ion trap segments by lowering the DC potential of the middle segment; (b) between two segments and a terminal electrode by lowering the potential of the segment adjacent to a terminal electrode and (c) between a single ion trap segment and two terminal electrodes disposed on either side of the ion trap by lowering the DC electrical potential of the segment. The trapping region may also be generated by a voltage bias applied to one or more electrodes arranged externally to the poles of the linear ion trap to form a DC field component superimposed onto the RF trapping field component.

Analyte ions transferred to and stored in the trapping region of the linear ion trap are thermalized by collisions with buffer gas molecules. The partial pressure of the buffer gas molecules used for collisional cooling and thermalization can be static or can be controlled dynamically by using one or more gas pulse valves. Dynamic control of the buffer gas pressure allows for efficient trapping and thermalization of analyte ions over a well-defined time window while external injection of charged particles and reactive neutral species into the trapping region of the ion trap can be performed in a collision free environment to avoid scattering and eliminate by-product species formed by reactions between the externally injected charged particles and reactive neutrals with the buffer gas molecules. Differential pumping of the linear ion trap enhances the duty cycle of an experiment by reducing the residence time of buffer gas molecules in the trapping region. Pulsing gas into the linear ion trap also allows injection of greater quantities of gas to access higher pressures thus accelerating the process of internal energy relaxation and collisional cooling of the analyte and fragment ions.

Charged Particle Source

The apparatus of the present invention further includes the charged particle source, optionally coupled to an electron source, for producing charged particles and reactive neutrals, respectively. In one example, the gas discharge is generated inside the conduit, the discharge conduit, designed with an entrance part and an exit part for receiving a gas pulse from a high pressure region (i.e. the gas supply) and releasing the gas pulse entrained with charged particles generated in the discharge in the direction of the trapping region, respectively. A discharge electrode of the discharge device, biased at a high voltage (positive or negative), is disposed between the entrance and exit parts of the discharge conduit, forming a leak tight (i.e. hermetically sealed) conduit design or a channel. The discharge is generated during the high pressure transient established by the travelling gas pulse in the conduit. In one example, the discharge is a dielectric barrier discharge. Charged particles formed in the discharge are accelerated downstream by the expanding gas flow and the high voltage signal applied to the discharge electrode.

In one example, the entrance and exit parts of the discharge conduit are formed from a ceramic material and a static DC high voltage is applied to a stainless steel electrode (i.e. the discharge electrode), in which the stainless steel electrode is disposed between the entrance and exit parts. The absolute value of the positive voltage bias applied to the discharge electrode is found to be lower than the absolute value of the negative voltage bias required to ignite a dielectric barrier discharge under the same gas pulse conditions. When the discharge electrode is positively biased, the discharge is typically confined in the first part of the conduit, behind the first electrode. The discharge may extend all the way to the exit end of the second part of the discharge conduit when a negative voltage bias is applied instead. Static DC high voltages are preferred, reducing complexity while increasing the number of charged particles generated since the discharge occurs when the gas pulse pressure exceeds a threshold determined by the nature of the gas, the DC high voltage applied as well as the geometrical characteristics of the discharge device. Alternatively, the DC high voltage may be pulsed, for example synchronously with the gas pulse and/or during the gas pulse, for example at a relatively high frequency. The magnitude of the DC high voltage may be controlled, for example according to the gas and/or pressure in the conduit.

In the present invention, the charged particle source is operated in pulsed mode. Time-controlled operation of the charged particle source is preferable for synchronizing pulses of the charged particles and the optional reactive neutrals with respect to advanced operations performed with analyte ions present in the linear ion trap. Advanced operation in the linear ion trap involves performing tandem-in-time mass spectrometry experiments where multiple steps of ion isolation followed by activation-dissociation of analyte ions are performed sequentially. Advanced operation of the linear ion trap may also involve multidimensional multiple-stage experiments where different ion activation methods are applied in each step of a tandem-in-time experiment. These advanced operations require precise integration of the pulsed operation of the charged particle source with an extended set of timely controlled functions executed in a linear ion trap designed with one or more trapping regions.

Operating the charged particle source using pulsed gas mode instead of pulsing the high voltage for driving the discharge is advantageous for maintaining low background pressure levels in the linear ion trap to preserve ion stability conditions in a quadrupole or in a higher-order field used for radial confinement of analyte ions and activated or fragment species. Tandem mass analysis methods based on conventional continuous introduction of a gas to create a discharge and to generate charged particle beams for activating analyte ions suffer from elevated background levels of gas that result in scattering of trapped ions, poor sensitivity and overall reduced performance. For example, the resolution of ion isolation in a quadrupole ion trap is maximized in a collision free environment. The presence of a background gas during ion isolation reduces performance considerably by lowering the resolution of the isolation window and by promoting fragmentation of the analyte ions of interest. On the other hand, reducing the gas flow supplied to the charged particle source to minimize these effects is possible only at the expense of charged particle density. Low intensity charged particle beams for analyte ion activation—dissociation lead to insufficient fragmentation or extended reaction periods that are no longer compatible with front-end separation methods, such as liquid chromatography.

It is therefore advantageous to pulse gas for driving the charged particle source in pulsed mode in order to activate ions stored in the trapping region of an ion trap. In this particular pulsed mode of operation disclosed in the present invention integration in a timely controlled multiple-stage or tandem mass spectrometry experiment is accomplished seamlessly, while high density charged particle beams are easily produced. Specifically, pulsing gas in the discharge conduit allows for accessing a higher pressure regime where the density of the charged particles is maximized without affecting the pressure in the ion trap. In one example, the linear ion trap is differentially pumped to improve pumping speed in the trapping region. Furthermore, the electronic circuitry to generate a DC signal to ignite the discharge in the gas pulse is considerably simpler and more cost-effective compared to the circuitry required to pulse a high voltage signal to operate the discharge supplied with a continuous flow of gas in pulsed mode.

The charged particle source comprises the pulse valve. Suitable pulse valves are solenoid valves driving a poppet sealing against an orifice of few hundreds of microns in diameter for releasing gas pulses in a highly regulated manner. Other types of pulse valves may be used, for example valves designed with rotating disks or chopper valves.

A duration of the gas pulse, typically ranging from a few 10's of microseconds to several 10's of milliseconds, preferably from 500 μs to 25 ms, may be controlled by adjusting the pulse valve parameters, typically controlled by the width of a voltage pulse applied to a solenoid valve for example, or by adjusting the length and the internal diameter of the conduit. Longer conduits with smaller internal diameter (i.d.) can be designed to prolong the residence time of the charged particles injected through the trapping region accommodating analyte ions.

The pulse valve is configured to release the gas pulse from the gas supply (i.e. high pressure region) into the entrance of the conduit. In one example, a pressure of the gas in the gas supply is in a range from about 10 mbar to about 10 bar, preferably from about 1 bar to about 5 bar. In contrast, the pressure in the conduit in the absence of a gas pulse is typically below $10^{-3}$ mbar, while the pressure in the ion trap in the absence of a gas pulse is typically below $10^{-4}$ mbar.

In one example, the gas comprises and/or is hydrogen, for example molecular hydrogen. Other types of gases or high vapor pressure species, for example helium or argon, gas mixtures or noble gases seeded with water molecules to form hydronium ions, $(H_2O)_nH^+$ in the discharge as well as negatively charged particles (antracene, PFMD) that may lead to fragmentation or ion-ion proton transfer reactions for abstracting protons from multiply charged precursors can be utilized.

In one example, the pulse valve is configured to release the gas pulse from the gas supply intermittently or periodically, for example at a frequency of 10 Hz to 100 Hz, and/or synchronously with storing the analyte ions in the trapping region of the linear ion trap.

In one example, the gas supply comprises and/or is a selectable gas supply, configured to supply a plurality of gases, individually or a mixture of two or more thereof. In this way, the charged particles may be selected according to the analyte ions, for example.

Electrical Conductors

In one example, the apparatus comprises a set of electrodes arranged between the exit of the conduit and the linear ion trap, supplied with a first DC signal to guide the charged particles therethrough, in the direction of the trapping region. In this way, a number of charged particles guided into the trapping region of the linear ion trap is increased.

In one example, the apparatus comprises a divergence electrode disposed between the charged particle source and the set of electrical conductors configured to control divergence of the charged particles. In this way, divergence of the charge particles is attenuated, thereby increasing a number of charged particles guided into the trapping region of the linear ion trap.

In one example, the apparatus comprises a deflection electrode disposed between the set of electrical conductors and the linear ion trap, supplied with a second DC signal to prevent the charged particles, for example only the charged particles, from entering the trapping region. In this way, the charged particles are prevented from entering the trapping region while reactive neutral particles are admitted, such that activation and/or dissociation of the analyte ions in the trapping region is by interaction of the analyte ions with the reactive neutral particles only. This is described with respect to a second mode of operation. In one example, the deflection electrode comprises and/or is a grid, for example on-axis having a transmission of at least 90%, and/or a repeller, for example off-axis.

In one example, the set of electrical conductors comprises an incandescent electron source, for example a heated filament emitting light and optionally electrons by thermionic emission, configured to create reactive neutral particles from the charged particles, directed towards the trapping region. In this way, the reactive neutral particles are created from the charged particles by neutralization reactions involving charged particles entrained in the pulsed beam interacting with intermediate reaction species including electrons or directly by electron capture.

In one example, the set of electrical conductors is configured to provide the charged particles and the reactive neutral particles (i.e. both the charged particles and the reactive neutral particles) to activate the analyte ions in the trapping region. In this way activation and/or dissociation of the analyte ions in the trapping region is by interaction of the analyte ions with the charged particles and the reactive neutral particles. This is described with respect to a first mode of operation.

In one example, the charged particles react to form reactive neutral species during transport through the incandescent electron source. In this way, a high density beam of reactive neutrals is injected with the desired kinetic energy in the trapping region to activate analyte ions stored therein.

In one example, the charged particles interact with the incandescent electron source to capture an electron from the conduction band of the electrical conductor to form reactive neutral particles. In this way, a portion of the kinetic energy of the charged particles en route to the trapping region is lost on the surface of the electrical conductor and the electrical potentials applied to the upstream electrodes must be adjusted accordingly to control beam divergence and tune the final kinetic energy of the reactive neutrals.

In one example, the charged particles react with gas phase electrons produced by thermionic emission from the incandescent electron source to form activated or radical neutral species. In this way, direct electron capture may require a different set of electrical potentials to optimize injection efficiency.

In one example, the kinetic energy of the reactive neutral particles is adjusted by controlling a potential difference between the charged particle source and the electron source. In this way, the cross section of the reaction between the reactive neutrals and analyte ions stored in the trapping region is optimized. In one example, the kinetic energy of the reactive neutrals can be tuned to maximize the attachment efficiency of hydrogen atoms to analyte ions without inducing fragmentation, or for example, to increase kinetic energy of the hydrogen atoms to induce fragmentation.

In one example, the deflection electrode is configured to allow the reactive neutral particles, for example only (i.e. the charged particles, for example only the charged particles, are prevented from entering the trapping region), to be injected into the linear ion trap to activate the analyte ions in the trapping region. In this way activation and/or dissociation of the analyte ions in the trapping region is by interaction of the analyte ions with the reactive neutral particles only. This is described with respect to a second mode of operation.

In one example, the incandescent electron source is not included or is deactivated. In this way activation and/or dissociation of the analyte ions in the trapping region is by interaction of the analyte ions with the charged particles only. This is described with respect to a third mode of operation. In one example, the charged particle source is configured to provide the charged particles, for example only, in the trapping region to activate the analyte ions in the trapping region.

In one example, the charged particles are accelerated to the desired kinetic energy by controlling the voltage applied to the discharge device. In this way, the discharge device simultaneously generates the discharge, thereby generating the charged particles, and controls acceleration and hence kinetic energy thereof.

In one example, the kinetic energy of the charged particles is adjusted by controlling a potential difference between the charged particle source and the linear ion trap. In this way, activation of analyte ions is performed in a controlled manner. For example energetic charged particles may lead to ionization, detachment of electrons from analyte ions, followed by electron capture and/or proton abstraction to form charge-reduced hydrogen deficient and/or hydrogen abundant radical species, which can be processed further in the linear ion trap. In another example, the energy of the charged particles is tuned to optimize fragmentation efficiency and maximize sequence and/or structural information of the analyte ions present in the trapping region of the linear ion trap.

Controller

In one example, the apparatus comprises a controller configured to: control the RF electrical potential supply to apply the respective RF waveforms to the pairs of pole electrodes; control the pulse valve to release the gas pulse from the gas supply into the entrance of the conduit; control one or more electrical potential supplies electrically coupled to the discharge device to apply high voltages to the discharge device to generate the discharge in the gas pulse in the conduit; control a set of DC signals supplied to the set of electrodes and/or a set of DC signals and/or a heating current supplied to electrical conductors arranged between the exit of the conduit and the linear ion trap; control a second DC signal control supplied to a deflection electrode disposed between the set of electrical conductors and the linear ion trap; control an incandescent electron source; control a voltage applied to a divergence electrode disposed between the charged particle source and the set of electrical conductors; control a potential difference between the charged particle source and the electron source to adjust the kinetic energy of the reactive neutral particles; control the voltage applied to the discharge device to accelerate the charged particles to the desired kinetic energy; and/or control a potential difference between the charged particle source and the linear ion trap to adjust the kinetic energy of the charged particles.

Method

The second aspect provides a method of directing charged particles, and optionally reactive neutral particles, into a trapping region of a linear ion trap, the method comprising:

- releasing a gas pulse from a gas supply into the entrance of a conduit extending in the direction of the trapping region; and
- generating a discharge in the gas pulse in the conduit, thereby generating charged particles from the gas and accelerating the generated charged particles in the direction of the trapping region;
- optionally, converting a fraction of the accelerated charged particles into reactive neutral particles by transporting the charged particles through an incandescent electron source arranged between the discharge and the trapping region; and
- optionally, directing the remainder fraction of the accelerated charged particles together with the converted reactive neutral particles in the direction of the trapping region.

The charged particles, the reactive neutral particles, the trapping region, the linear ion trap, the gas pulse, the gas supply, the entrance, the conduit, generating the charged particles, accelerating the generated charged particles, converting the fraction of the accelerated charged particles into reactive neutral particles, the incandescent electron source and/or directing the accelerated charged particles together with the converted reactive neutral particles in the direction of the trapping region may be as described with respect to the first aspect. The method may include any of the steps described with respect to the first aspect mutatis mutandis.

In one example, the method comprises deflecting the remainder fraction of the accelerated charged particles and activating analyte ions stored in the trapping region by the converted reactive neutral particles.

Mass Spectrometer

The third aspect provides a mass spectrometer comprising an apparatus according to the first aspect and/or adapted to perform the method according to the second aspect.

Definitions

Throughout this specification, the term "comprising" or "comprises" means including the component(s) specified but not to the exclusion of the presence of other components. The term "consisting of" or "consists of" means including the components specified but excluding other components.

The optional features set out herein may be used either individually or in combination with each other where appropriate and particularly in the combinations as set out in the accompanying claims. The optional features for each aspect or exemplary embodiment of the invention, as set out herein are also applicable to all other aspects or exemplary embodiments of the invention, where appropriate. In other words, the skilled person reading this specification should consider the optional features for each aspect or exemplary embodiment of the invention as interchangeable and combinable between different aspects and exemplary embodiments.

FIG. 1 shows an example schematic diagram of the apparatus 100 highlighting the charged particle source 101 coupled to a linear quadrupole ion trap 102. A pulse valve 103 is connected externally to the vacuum housing 104 and releases pulses of gas through an orifice 105, having a diameter of approximately 150 μm, into a conduit. The conduit comprises a first part 106 and a second part 107 arranged in series for transporting the gas in the direction of the linear ion trap 102. A first electrode 108 is disposed between the first and the second parts of the conduit and supplied with a high voltage signal produced in an external electrical potential generator 109. A dielectric barrier discharge 110 is developed when pressure inside the conduit during the gas pulse is raised above a threshold exceeding the breakdown limit. The high voltage signal applied to the first electrode 108 will also accelerate charged particles in the direction of the trapping region 115.

Charged particles and electrons generated in the discharge 110 are entrained in the carrier gas flow travelling through the conduit ultimately forming a free jet expansion at the exit end of the second part of the conduit 107. In this example, the inner diameter of the conduit is 2 mm. A second electrode 111 is disposed at the end of the conduit 107 and supplied with a high voltage signal produced in an external electrical potential generator 109. A third electrode 112 is disposed between the charged particle source 101 and the linear ion trap 102 and also supplied with a high voltage signal produced in an external electrical potential generator 109. The second 111 and third 112 electrodes jointly form a focusing lens for controlling the divergence of the charged particle beam 114 in the direction of the trapping region 115. The focusing lens formed between the second 111 and third 112 electrodes can also be used for deflecting electrons entrained in the gas flow at the exit of the conduit 107.

In this example, an RF electrical potential generator 117 is employed for producing two RF waveforms, each applied to respective pairs of pole electrodes of the linear quadrupole ion trap forming a RF trapping field component a trapping region 115 to trap analyte ions 116 radially. The pulsed beam of charged particles 114 is injected through an aperture on the side pole-electrode of the linear ion trap into the trapping region 115 to activate or dissociate analyte ions 116. An additional focusing electrode 113 may also be disposed near the aperture to optimize the overlap between externally injected charged particles 114 and analyte ions 116. This focussing electrode 113 may additionally and/or alternatively function to deflect the charged particles, as described herein. Similarly, the second 111 and third 112 electrodes may additionally and/or alternatively function individually or together, optionally with the electrode 113, to deflect the charged particles, as described herein. A steering lens may also be disposed between the charged particle source 101 and the linear ion trap 102 to optimize the efficiency of analyte ion activation.

Figure 2:
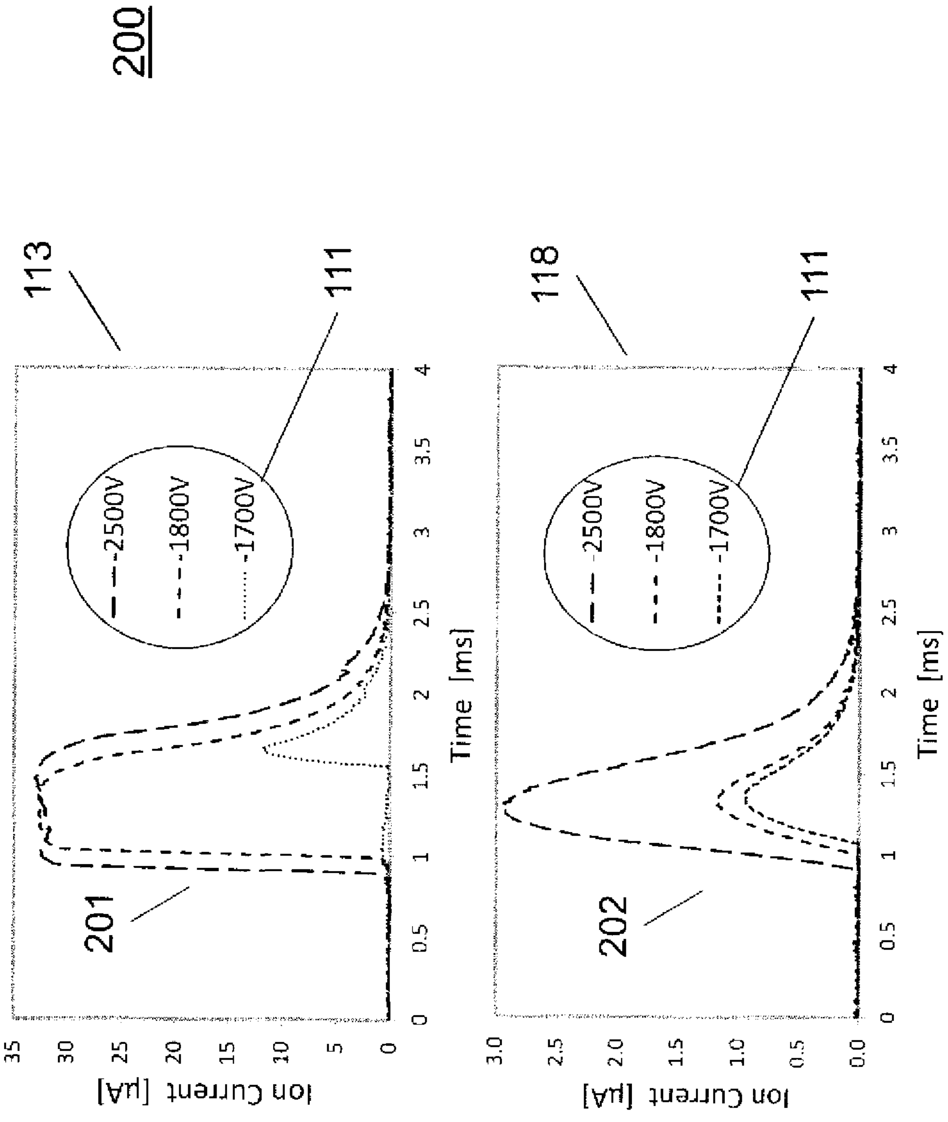
FIG. 2 shows graphs of ion current as a function of time for the apparatus of FIG. 1.

When a positive voltage bias is applied to the first electrode 108 generating the discharge, a pulse of positively charged particles is measured at the exit of the discharge conduit. In the example shown in FIG. 2 a series of positive ion current measurements 200 is conducted for molecular hydrogen gas using a fast oscilloscope connected to electrodes 113 and 118 respectively. The oscilloscope is triggered by a voltage pulse applied to the gas pulse valve. Oscilloscope traces 201 and 202 are shown for different voltages applied to electrode 111. The transfer time between releasing the gas pulse from the pulse valve and the arrival time of hydrogen ions, Fr, $H^+$, $H_2^+$ and $H_3^+$ onto electrodes 113 and 118 are of the order of ~1 ms.

The duration of the ion current pulse produced as a result of charged particle formation in the discharge generated in a gas pulse is determined by the time characteristics of the gas pulse profile. The time width of the ion current pulses 201 and 202 may extend from a few hundreds of μs to several tens of milliseconds. In the example shown in FIG. 2, the residence time of the hydrogen gas and hydrogen charged particles in the trapping region is approximately 2.5 ms. A gas pulse with duration greater than 100 ms may have a negative impact on the operation of the vacuum system and the ion stability parameters of the ion trap.

The peak intensity of the ion current pulse is also determined by the amplitude of the voltage bias applied to the first electrode 108. A lower voltage bias (<1 KV) for a 2 mm internal diameter (i.d.) conduit will generate an ion current pulse with a peak of a few hundreds of nanoampere. A higher voltage bias (>2 KV) for a 2 mm i.d. conduit will generate an ion current pulse with a peak of several tens of microampere. In the example shown in FIG. 2, ion current produced by hydrogen charged particles and measured on electrode 113 is ~30 μA while losses in transmitting hydrogen charged particles through the trapping region reduce the ion current to ~3 μA at the opposite end of the linear ion trap on electrode 118.

The kinetic energy of the charged particles produced in the discharge is of the order of the voltage bias applied to the first electrode 108 integrated between the first and second parts of the discharge conduit 106, 107, as indicated by stopping potential experiments. In one example, the dimensions of the conduit are designed to reduce the amplitude of the voltage signal applied to electrode 108 to ignite the discharge and consequently reduce the kinetic energy of the charged particles produced in the charged particle source. In one example, the second part of the conduit is removed and the second electrode 11 is disposed in the vicinity of the first discharge electrode 108 to provide fine control of the kinetic energy of the charged particles.

The kinetic energy of the charged particles may also be controlled by replacing the second part of the conduit 107 typically constructed from an insulating material, typically ceramic, with a resistive glass tube. The resistive glass tube will generate a DC gradient within the conduit along the axis of the gas flow and decelerate or accelerate the charged particles to the desired kinetic energy. Experiments have also revealed that the duration of the pulse of charged particles injected through the trapping region can also be controlled by adjusting the DC gradient established across the resistive glass tube.

Figure 3:
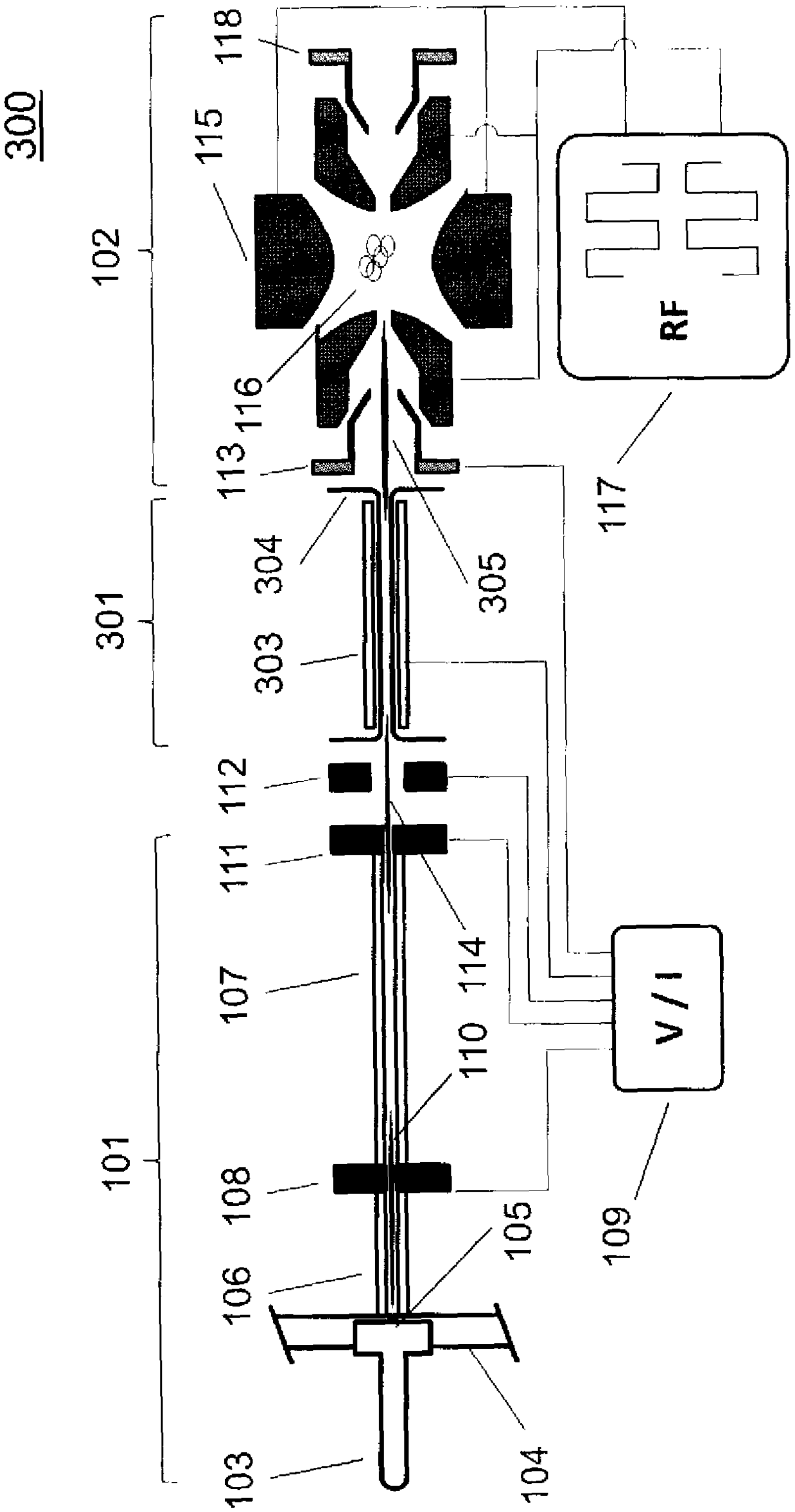
FIG. 3 schematically depicts an apparatus according to an exemplary embodiment.

In one example shown in FIG. 3, an electron source 301 is integrated into the apparatus 300 and disposed between the charged particle source 101 and the linear ion trap 102. The electron source 301 is arranged downstream from the second 111 and third 112 electrodes for receiving a pulsed beam of charged particles 114 produced in the gas pulse. The electron source 301 is designed for neutralizing the charged particles 114 generated in the discharge 110 and accelerated in the direction of the trapping region 115. The electron source 301 is shaped into a conduit for radial confinement of the gas pulse moving in the direction of the trapping region 115 in the form of a free jet as well as the charged particles 114 entrained therein. In one example also shown in FIG. 4, the electron source is comprised of a series or ribbon or wire filaments 304 stretched through and along the axis of an insulating or a conductive pipe 303, the electron source conduit. The ribbon filaments 304 are connected in series or in parallel and driven to incandescent temperatures by passing several ampere of heating current. Heating currents in excess of 20 A are prohibitive for operating the electron source adjacent to the linear ion trap efficiently due to the excessive heat produced during operation. Thin ribbon filaments 304 or wires are therefore preferred. In one example shown in FIG. 4, the conduit of the electron source is a thin wall cylindrical pipe 401 produced from refractory metals, for example tungsten, tantalum or rhenium. Other materials with enhanced thermionic emission properties at elevated pressures are also desirable, for example yttria coated iridium. Thoriated tungsten is may also be a preferred material for the low work function properties and low temperature operation. The cylindrical pipe 401 is supported by two legs 402 attached on either end and carefully aligned with the axis of the pulsed beam of charged particles 114.

Figure 4:
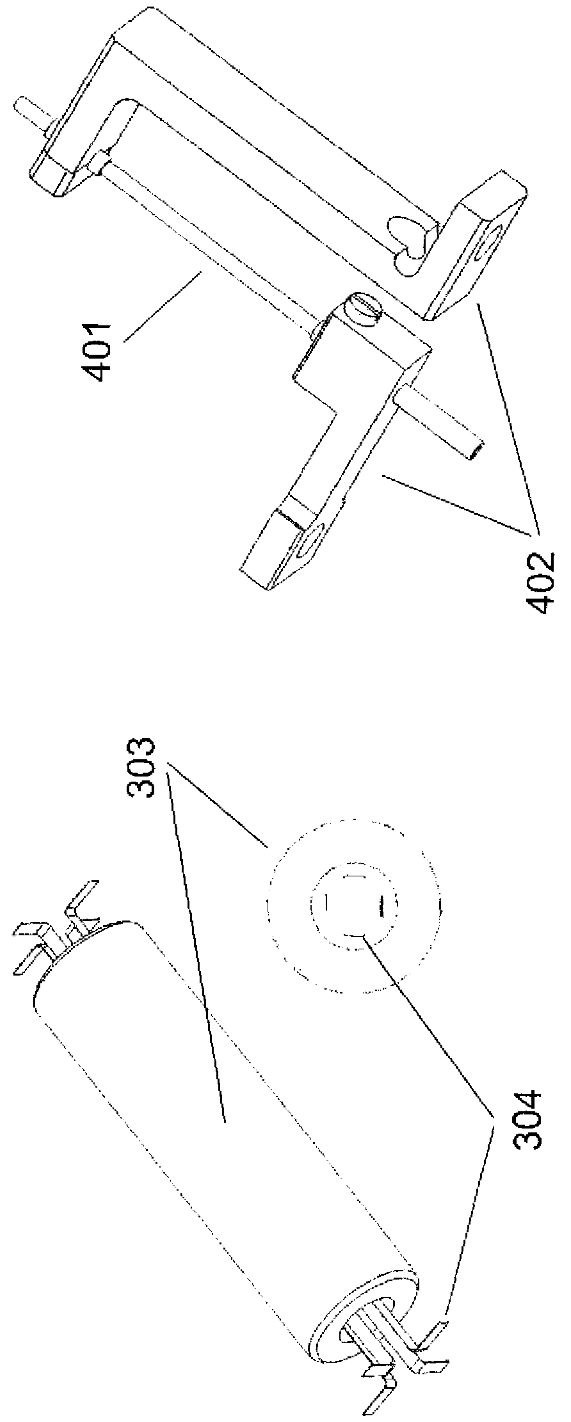
FIG. 4 schematically depicts the apparatus of FIG. 3, in more detail.

In both configurations described with reference to FIG. 4, thermionic emission of electrons produces a high density electron cloud and a high-temperature low work function surface. Interactions between the charged particles 114 and the electron cloud or the hot surface of the filaments leads to neutralization of charged particles to form reactive neutrals moving in the direction of the trapping region 305. The efficiency of the reaction converting the pulsed beam of charged particles 114 to a pulsed beam of reactive neutrals 305 is also found by experimentation to be temperature dependent. The higher the temperature of the filament is, the greater the conversion efficiency becomes.

A third electrode 112 is disposed between the second electrode 111 attached to the exit end of the discharge conduit 107 and the electron source 301. The third electrode 112 is supplied with a voltage bias to control the divergence of the pulsed beam of charged particles 114 produced in the discharge 110. Ideally, the voltage bias is adjusted to optimize the angle of incidence of the charged particles onto the hot surface of the filaments 304 or onto the hot surface of the cylindrical refractory metal pipe 401.

In the present invention, the apparatus 300 can be operated in three different modes. In the first mode of operation, the charged particles 114 formed in the discharge conduit 106, 107 are directed through the electron source 301 and are partially neutralized. The pulsed beam of reactive neutrals 305 formed in the process together with the remaining population of charged particles are injected into the trapping region 115 of the linear ion trap to activate or dissociate analyte ions 116 stored therein.

In the second mode of operation, an additional electrode, for example electrode 113, disposed downstream of the electron source 301 is supplied with a voltage bias sufficiently high or synchronized with the gas pulse and the corresponding beam of charged particles based on the information provided in Figure to deflect or stop the accelerated charged particles from entering into the trapping region 115 of the linear ion trap. Analyte ions 116 are therefore activated only via interactions with a pulsed beam of reactive neutrals 305 generated by the charged particles 114 neutralized during transport through the electron source 301.

In the third mode of operation, the heating current for driving the filaments to incandescent temperatures is switched off. The charged particles 114 produced in the discharge 110 are injected into the trapping region 115 for activating or dissociating ions. The voltage signals applied to the second 111 and third 112 electrodes used for controlling the beam divergence of the pulsed beam of charged particles 114 may differ between the different modes of operation.

For example, the neutralization process described in the second mode may require a diverging beam entering the source of electrons for optimizing the angle of incidence of the charged particles 114 onto the hot surface, while direct injection of charged particles for optimizing activation of analyte ions 116 may require a converging beam to be transmitted through the electron source 301.

Biasing the electron source to optimize focusing of charged particles and generation of reactive neutrals is also desirable. This is accomplished by floating the source of heating current to the desired DC level. Additional electrodes installed in the vicinity of the pole-electrodes of the ion trap maybe required to maximize the overlap between the analyte ion stored in the trapping region of the linear ion trap and externally injected charged particles or reactive neutrals.

Figure 5:
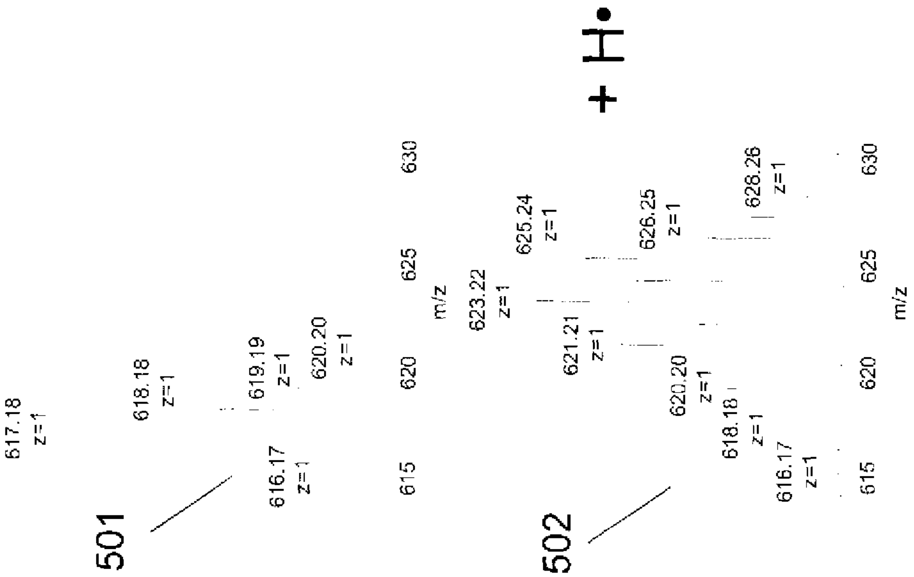
FIG. 5 shows mass spectra for hydrogen atom attachment to heme B ions, obtained using the apparatus of FIG. 3.

An example of generating reactive neutrals using the geometry disclosed in the present invention involves at least one pulse of molecular hydrogen gas released from a gas pulse valve into the discharge conduit. During the high pressure transient of the molecular hydrogen pulse, a discharge is generated by the high voltage applied to the discharge electrode. A series of hydrogen ions are formed, including $H^+$, $H_2^+$ and $H_3^+$ entrained in the flow of gas undergoing free jet expansion. The mass of the ions produced in the discharge have been determined experimentally by disposing a residual gas analyzer (quadrupole mass filter) downstream of the discharge. Experimental results indicated that the relative concentration of atomic hydrogen ions, $H^+$, is maximized at the lower pressures while the formation of trihydrogen cations, $H_3^+$, is maximized at the highest pressures. By careful adjustments of the voltages applied to the electrodes of the charged particle and electron sources, a high density pulse of hydrogen neutral radicals, $H^+$, with kinetic energies above thermal is directed into the trapping region of the linear ion trap. A deflection or a stopping potential applied to an electrode disposed between the electron source and linear ion trap may be used to deflect all remaining hydrogen ions that have not been converted into radical neutral species. In this mode of operation, analyte ions will interact only with a pulsed beam of fast neutral radical hydrogen atoms, $H^-$, leading to hydrogen attachment, hydrogen abstraction reactions, the dissociation of double bonds via attachment of hydrogen atom pairs and also to fragmentation of protonated or radical analyte ions. FIG. 5 shows an example of hydrogen atom attachment to heme B ions stored in the trapping region and irradiated by multiple pulses of fast hydrogen radical species. The first mass spectrum 501 shows the isotopic distribution of the heme B ions prior to irradiation while the second mass spectrum 502 highlights the shift in the isotopic distribution observed at the end of the irradiation process due to multiple hydrogen atom attachment. The reduction of double bonds in heme B occurs via attachment of hydrogen atoms in pairs, each accommodated by the unpaired valence electron produced by the opening of the double bond.

Figure 6:
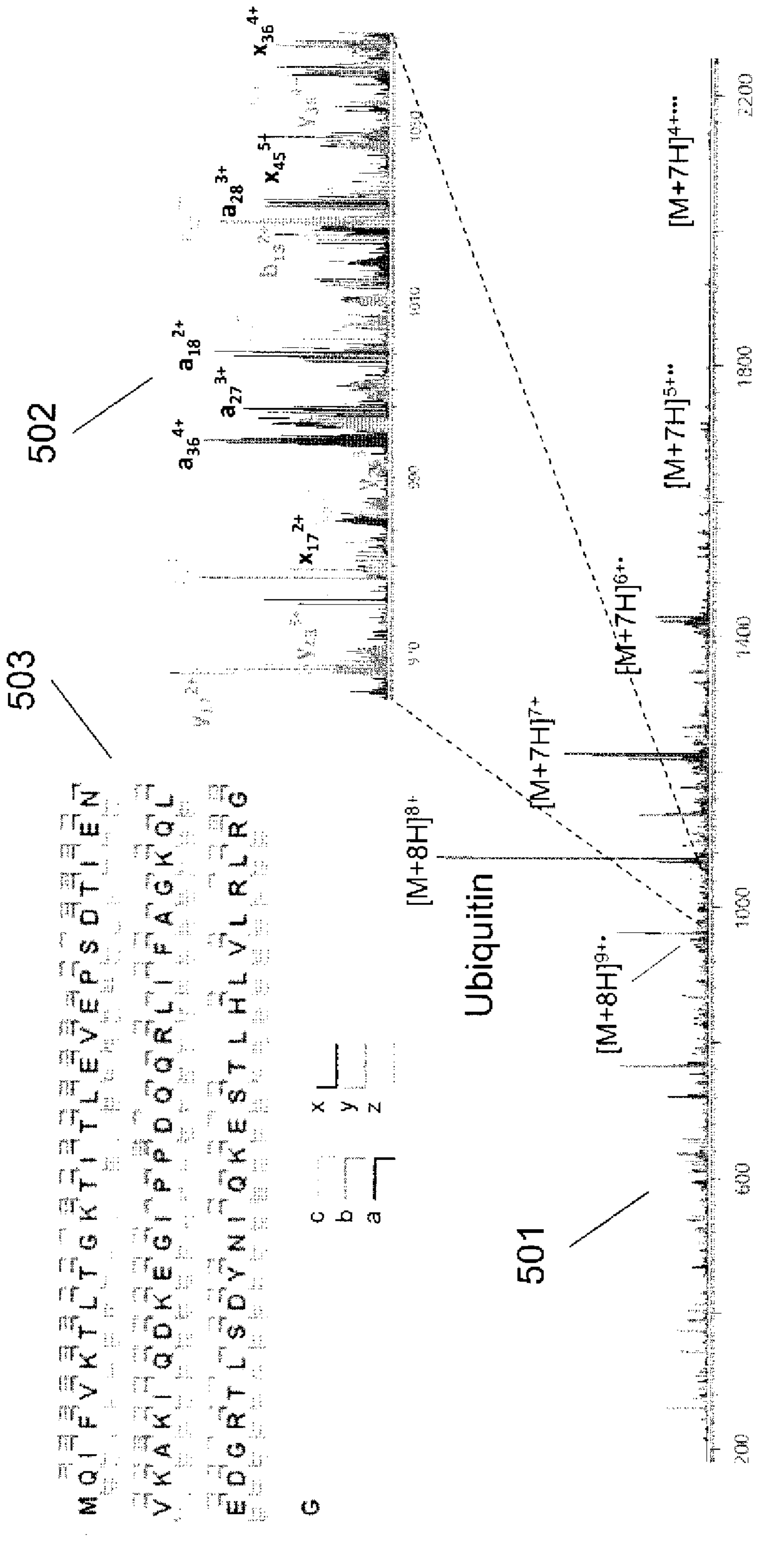
FIG. 6 shows a mass spectrum of the $[M+8H]^{8+}$ charge state of protonated ubiquitin, obtained using the apparatus of FIG. 3.

The fragmentation mass spectrum 501 of the $[M+8H]^{8+}$ charge state of protonated ubiquitin, a small size protein produced by electrospray ionization, using hydrogen charged particles injected in the trapping volume with ~1 KeV energy is presented in FIG. 6. Complete sequence coverage is obtained 503 with all types of primary fragment ions observed throughout the backbone. A close-up region of the mass spectrum 502 is also shown, highlighting the different types of fragments and the corresponding isotopic distributions assigned manually. Also annotated in the mass spectrum are the precursor ions $[M+8H]^{8+}$, and a series of activated precursor ions indicating the detachment of electrons to form hydrogen deficient species as well as proton abstraction and charge reduction effects leading to the formation of radical hydrogen-abundant protein ions.

Figure 7:
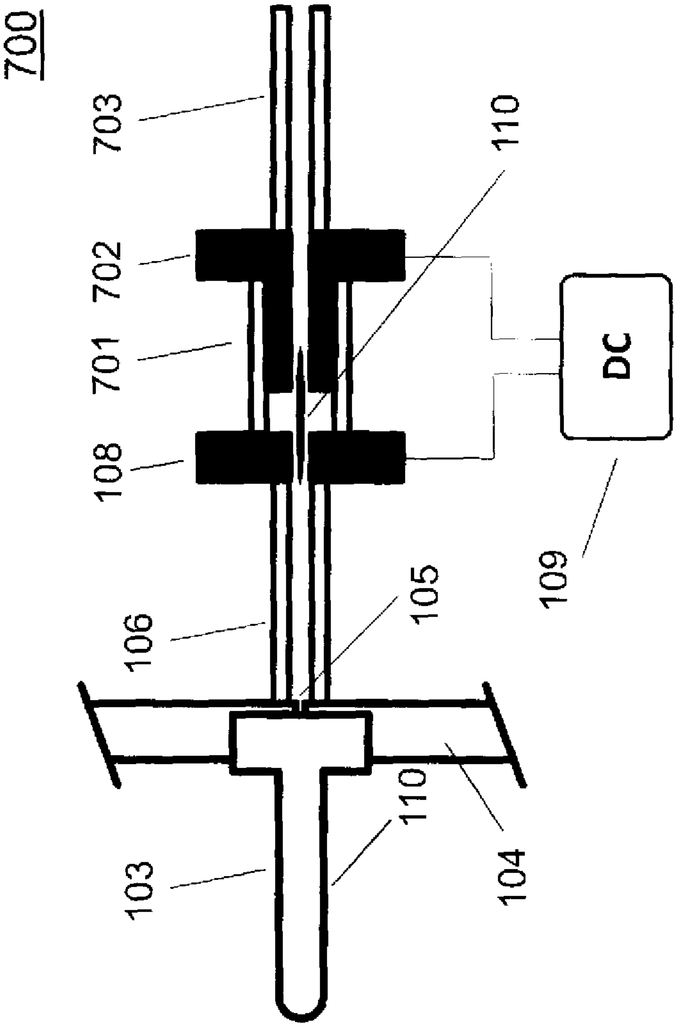
FIG. 7 schematically depicts an apparatus according to an exemplary embodiment.

In yet another example of the present invention shown in FIG. 7, the discharge 110 is ignited between the first electrode 108 and an additional electrode 702 disposed further downstream. In this configuration a second 701 and a third part 702 forming the conduit are required to confine the gas pulse and raise pressure above the breakdown limit. Similarly, a first electrical potential generator 109 is used to generate a voltage applied to the first electrode 108 and a second electrical potential generator 703 is used to generate a second voltage applied to the additional electrode 702. In one example, the first electrical potential generator 109 is floating at the potential produced by the second electrical potential generator 703. The kinetic energy of the charged particles formed in the discharge 110 and injected into the ion trap or into the electron source can then be controlled by adjusting the potential difference between the two electrodes 108 and 702 at different voltage levels. For example, if a potential difference of 500V is required to initiate the discharge, this difference can be generated by two positive voltage signals at any level, by two negative signals at any level or by one positive and one negative voltage signal applied to the two electrodes respectively. Additional electrodes to focus the pulsed beam of charged particles produced in the discharge 110 and disposed further downstream can be utilized to control beam divergence, deflect electrons and also remove charged particles after an electron source for injecting only reactive neutrals into the trapping region with the desired kinetic energy. In another example, the two electrode configuration 108 and 702 driven by two electrical potential generators 109 and 703 as described with reference to FIG. 7 is combined with the source of reactive neutrals 301 disclosed in FIG. 3. Other configurations to control the kinetic energy of the charged particle and reactive neutral species are envisaged, for example using the first electrical potential generator 109 to float the second electrical potential generator 703 shown in FIG. 7.

Although a preferred embodiment has been shown and described, it will be appreciated by those skilled in the art that various changes and modifications might be made without departing from the scope of the invention, as defined in the appended claims and as described above.

In summary, the invention provides a hybrid source of charged, and optionally reactive neutral, particles for activation-dissociation of trapped ions.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims and drawings), and/or all of the steps of any method or process so disclosed, may be combined in any combination, except combinations where at most some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims and drawings), or to any novel one, or any novel combination, of the steps of any method or process so disclosed.

The invention claimed is:

1. An apparatus comprising:

a linear ion trap having a longitudinal axis and being disposed in a vacuum housing, the linear ion trap comprising two pairs of pole electrodes and a radiofrequency (RF) electrical potential supply configured to apply respective RF waveforms to the pairs of pole electrodes, thereby forming a RF trapping field component to trap analyte ions radially in a trapping region of the linear ion trap for processing of the analyte ions therein; and a charged particle source disposed in the vacuum housing and coupled to the linear ion trap, the charged particle source comprising a pulse valve, a conduit extending toward in the direction of the trapping region in a direction perpendicular to the longitudinal axis of the linear ion trap and having an entrance in fluid communication with the pulse valve and an exit, and a discharge device electrically coupled to an electrical potential supply and disposed between the entrance and the exit of the conduit, wherein the pulse valve is configured to release a gas pulse from a gas supply into the entrance of the conduit, and wherein the electrical potential supply is configured to apply a high voltage to the discharge device to generate a discharge in the gas pulse in the conduit, thereby (a) generating charged particles from the gas to establish a high-pressure transient in the conduit while minimizing a gas load to the linear ion trap and (b) accelerating the generated charged particles in the direction of towards the trapping region in the direction perpendicular to the longitudinal axis of the linear ion trap to activate the analyte ions in the trapping region.

2. The apparatus of claim 1, further comprising a set of electrical conductors arranged between the exit of the conduit and the linear ion trap, the set of electrical conductors being supplied with a first DC signal to guide the charged particles therethrough, in the direction of the trapping region.

3. The apparatus of claim 2, further comprising a divergence electrode disposed between the charged particle source and the set of electrical conductors and configured to control divergence of the charged particles.

4. The apparatus of claim 2, further comprising a deflection electrode disposed between the set of electrical conductors and the linear ion trap, the deflection electrode being supplied with a second DC signal to prevent the charged particles from entering the trapping region.

5. The apparatus of claim 2, wherein the set of electrical conductors comprises an incandescent electron source configured to create reactive neutral particles from the charged particles which are directed towards the trapping region.

6. The apparatus of claim 5, wherein the set of electrical conductors is configured to provide the charged particles and the reactive neutral particles to activate the analyte ions in the trapping region.

7. The apparatus of claim 6, wherein the deflection electrode is configured to allow the reactive neutral particles to be injected into the linear ion trap to activate the analyte ions in the trapping region.

8. The apparatus of claim 5, wherein the charged particles are neutralized during transport through the incandescent electron source.

9. The apparatus of claim 5, wherein the charged particles interact with the incandescent electron source to capture an electron from the conduction band of the conductor to form the reactive neutral particles.

10. The apparatus of claim 5, wherein the charged particles react with gas phase electrons produced by thermionic emission from the incandescent electron source to form activated or radical neutral particles.

11. The apparatus of claim 5, wherein the kinetic energy of the reactive neutral particles is adjusted by controlling a potential difference between the charged particle source and the electron source.

12. The apparatus of claim 1, wherein the charged particle source is configured to provide the charged particles in the trapping region to activate the analyte ions in the trapping region.

13. The apparatus of claim 1, wherein the charged particles are accelerated to the desired kinetic energy by controlling the voltage applied to the discharge device.

14. The apparatus of claim 1, wherein the kinetic energy of the charged particles is adjusted by controlling a potential difference between the charged particle source and the linear ion trap.

15. A method of directing charged particles and reactive neutral particles into a trapping region of a linear ion trap, the method comprising:

releasing a gas pulse from a gas supply into the entrance of a conduit extending in the direction of the trapping region;

generating a discharge in the gas pulse in the conduit, thereby generating charged particles from the gas and accelerating the generated charged particles in the direction of the trapping region;

converting a fraction of the accelerated charged particles into reactive neutral particles by transporting the charged particles through an incandescent electron source arranged between the discharge and the trapping region; and directing the remainder fraction of the accelerated charged particles together with the converted reactive neutral particles in the direction of the trapping region.

16. The method of claim 15, further comprising deflecting the remainder fraction of the accelerated charged particles and activating analyte ions stored in the trapping region by the converted reactive neutral particles.

17. An apparatus comprising:

a linear ion trap disposed in a vacuum housing and having a longitudinal axis and a trapping region configured to store analyte ions; and a charged particle source disposed in the vacuum housing and coupled to the linear ion trap, the charged particle source comprising:

a conduit extending towards the trapping region in a direction perpendicular to the longitudinal axis of the linear ion trap and having an entrance and an exit;

a pulse valve disposed in fluid communication with the conduit and configured to release a gas pulse from a gas supply into the entrance of the conduit; and a discharge device electrically coupled to an electrical potential supply and disposed between the entrance and the exit of the conduit, the electrical potential supply being configured to apply a high voltage to the discharge device to generate a discharge in the gas pulse in the conduit, thereby (a) generating charged particles from the gas to establish a high-pressure transient in the conduit while minimizing a gas load to the linear ion trap and (b) accelerating the generated charged particles towards the trapping region in the direction perpendicular to the longitudinal axis of the linear ion trap to activate analyte ions stored in the trapping region.

18. The apparatus of claim 17, further comprising a set of electrical conductors arranged between the exit of the conduit and the linear ion trap, the set of electrical conductors being supplied with a first DC signal to guide the charged particles therethrough in the direction of the trapping region.

19. The apparatus of claim 18, wherein the set of electrical conductors comprises an incandescent electron source configured to create from the charged particles reactive neutral particles which are directed towards the trapping region.

20. The apparatus of claim 19, wherein the set of electrical conductors is configured to provide the charged particles and the reactive neutral particles to activate the analyte ions stored in the trapping region of the linear ion trap.

21. An apparatus comprising:

a linear ion trap disposed in a vacuum housing and comprising two pairs of pole electrodes and a radiofrequency (RF) electrical potential supply configured to apply respective RF waveforms to the pairs of pole electrodes, thereby forming a RF trapping field component to trap analyte ions radially in a trapping region of the linear ion trap for processing of the analyte ions therein; and a charged particle source disposed in the vacuum housing and coupled to the linear ion trap, the charged particle source comprising a pulse valve, a conduit extending in the direction of the trapping region of the linear ion trap and having an entrance in fluid communication with the pulse valve and an exit, and a discharge device electrically coupled to an electrical potential supply and disposed between the entrance and the exit of the conduit, wherein the pulse valve is configured to release a gas pulse from a gas supply into the entrance of the conduit, and wherein the electrical potential supply is configured to apply a high voltage to the discharge device to generate a discharge in the gas pulse in the conduit, thereby (a) generating charged particles from the gas entrained in a travelling gas pulse to establish a high-pressure transient in the conduit while minimizing a gas load to the linear ion trap, and (b) accelerating the generated charged particles in the direction of the trapping region to activate the analyte ions in the trapping region.

22. The apparatus of claim 21, wherein the discharge device comprises a single discharge electrode for generating the discharge in the gas pulse.

* * * * *